United States Patent [19]
Suzuki

[11] 4,417,663
[45] Nov. 29, 1983

[54] APPARATUS FOR DETERMINING THE SEX OF A CHICK

[76] Inventor: Kiyonobu Suzuki, 5 Weaver Dr., Salisbury, Md. 21801

[21] Appl. No.: 274,227

[22] Filed: Jun. 16, 1981

[51] Int. Cl.³ .............................................. B07C 5/342
[52] U.S. Cl. ..................................... 209/587; 209/509; 209/540; 209/546; 209/581; 356/448
[58] Field of Search ............... 209/509, 540, 546, 549, 209/555, 556, 558, 576, 577, 578, 579, 580, 581, 587, 933; 356/425, 448

[56] References Cited

U.S. PATENT DOCUMENTS

| Re. 26,916 | 6/1970 | Austin | 209/587 |
| 3,499,527 | 3/1970 | Badgley | 209/581 |
| 3,563,378 | 2/1971 | Myers | 209/587 |
| 3,859,522 | 1/1975 | Cuthbert | 209/587 X |
| 4,051,952 | 10/1977 | Hauptmann et al. | 209/555 X |

Primary Examiner—Robert B. Reeves
Assistant Examiner—Edward M. Wacyra
Attorney, Agent, or Firm—Koda and Androlia

[57] ABSTRACT

An apparatus for determining the sex of a chick which includes a sensor for sensing certain characteristics of the chick and for producing output values corresponding to each of the sensed characteristics, a comparator for comparing the output values with preset characteristic values and for producing affirmative signals whenever each of the output values correspond to the preset characteristic values and an indicator for indicating the sex of the chick in response to the affirmative signals.

6 Claims, 9 Drawing Figures

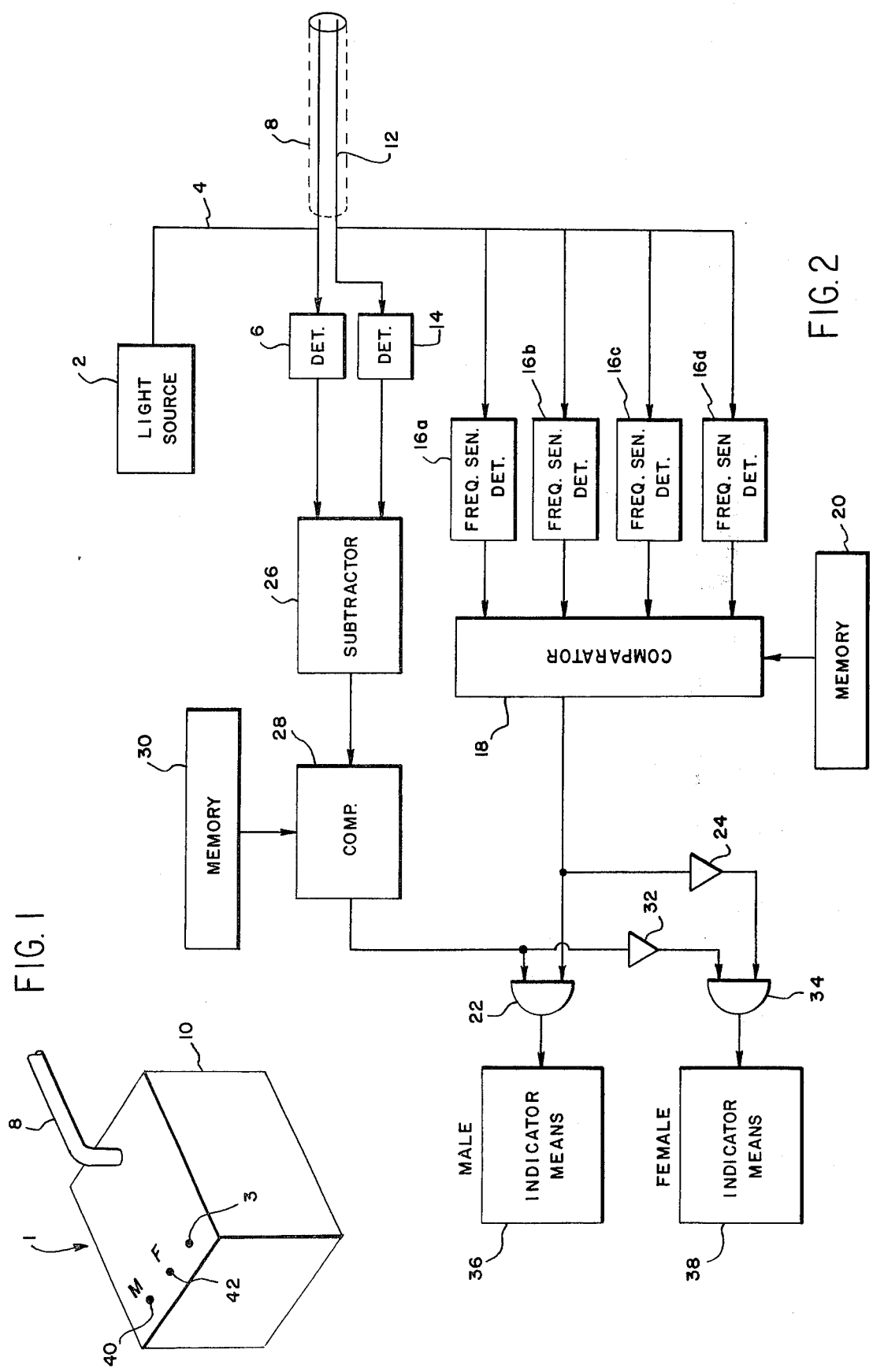

APPARATUS FOR DETERMINING THE SEX OF A CHICK

BACKGROUND OF THE INVENTION

1. Field of Invention

This invention relates to the determining of the sex of a chick and more particularly to apparatuses for automatically determining the sex of a chick.

2. Prior Art

Presently in the art the sex of a chick is determined manually by a human being. Such human beings are specially trained and make a determination as to the sex of a chick based upon their perception of certain characteristics of the chick. The characteristics which are of particular interest are those contained in the anus of the chick. These characteristics are color, shape, gloss and softness. The significance and differences are shown and described in "Study of the Fowl Sex and Sex Determination" by Kiyoshi Masui which was published on Oct. 20, 1975. From these characteristics a trained chick sex checker can determine the sex of a chick.

However, such human being must undergo a long training period and the accuracy of such human beings is determined by the degree of skill of each individual human being. Therefore, there has long been felt a need that chick sexing should be done by a machine so that the long training period and dependency on the individual skill of the sex checker can be eliminated.

To this end, there has been developed apparatuses which check the sex of a chick. One such apparatus consists of a mechanical device which inserts mechanical sensors into the anal area of a chick. This device, however, has been unsuccessful because it has certain disadvantages. These disadvantages are that the mechanical sensors may damage the chick and the device is no faster in determining the sex of a chick than a human being.

SUMMARY OF THE INVENTION

Accordingly, it is a general object of the present invention to provide an apparatus for determining the sex of a chick which can quickly and accurately determine the sex of a chick without causing damage to the chick.

It is another object of the present invention to provide an apparatus for determining the sex of a chick which can be utilized by a relatively untrained human being.

It is still another object of the present invention to provide an apparatus for determining the sex of a chick which determines the sex of a chick automatically.

In keeping with the principles of the present invention, the objects are accomplished by a unique apparatus for determining the sex of a chick. The apparatus includes a means for sensing certain characteristics of the chick and for producing output values corresponding to each of the sensed characteristics, a means for comparing the output values with preset characteristic values and for producing affirmative signals whenever each of said output values corresponds to the said preset characteristic values and a means for indicating the sex of the chick in response to the affirmative signals.

BRIEF DESCRIPTION OF THE DRAWINGS

The above-mentioned features and objects of the present invention will become more apparent with reference to the following description taken in conjunction with the following drawings, wherein like reference numerals denote like elements and in which:

FIG. 1 is a perspective view of the exterior of an apparatus for determining the sex of a chick in accordance with the teachings on the present invention;

FIG. 2 is a block diagram of the device of FIG. 1;

DETAILED DESCRIPTION OF THE INVENTION

Figure 3:
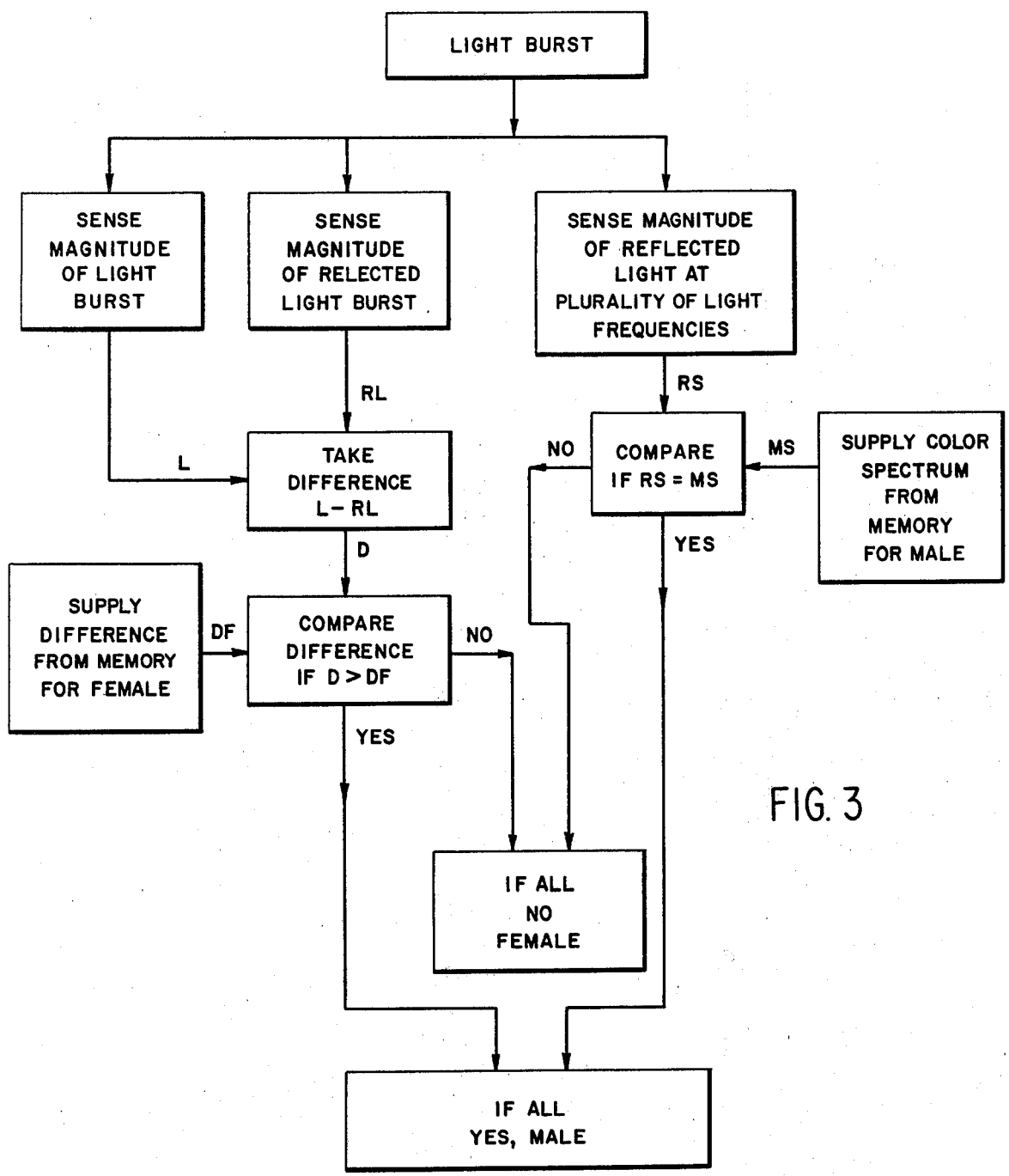
FIG. 3 is a flow diagram illustrating the operation of the block diagram of FIG. 2.

Referring more particularly to the drawings, shown in FIG. 1 is a perspective view of an apparatus for determining the sex of a chick in accordance with the teachings of the present invention. While in FIG. 2 is shown a block diagram of the apparatus for determining the sex of a chick of FIG. 1.

The apparatus includes a light source 2 which generates a burst of light. The burst of light from light source 2 is conveyed by a bundle of fiber optic filaments 4. The fiber optic filaments of the bundle 4 are split into two destinations. The first destination is light detector 6 and one or more filaments terminate at the detector 6. The remainder of the filaments of the fiber optic bundle extend up a tube 8 extending out of the apparatus housing 10. A second bundle 12 of fiber optic filaments is provided in the tube 8. This second bundle 12 is split between a plurality of destinations. One or more filaments of the bundle 12 terminates at a light detector 14. The remainder of the filaments terminate at a plurality of frequency sensitive light detectors 16a, 16b, 16c and 16d.

Each of these frequency sensitive light detectors 16a through 16d senses the magnitude of the light in the particular range that the frequency sensitive detector is sensitive to and generates an output signal corresponding to that magnitude. The outputs from the frequency sensitive detector 16a through 16d are provided to a comparator 18. To another input of the comparator 18 is provided the output of memory 20. In memory 20 is stored a plurality of signals corresponding to the preset magnitude values for each of the frequency ranges to which the frequency sensitive detectors 16a through 16d are sensitive. The output of comparator 18 is supplied to the input of AND gate 22 and inverter 24.

The outputs of light detectors 6 and 14 are supplied to subtractor 26. Subtractor 26 subtracts the output from detector 14 from the output of detector 6 and supplies a difference signal to comparator 28. To the other input from comparator 28 is applied an output from memory 30. Memory 30 outputs a signal which corresponds to a preset difference signal. The comparator 28 compares the difference signal from the subtractor 26 with the preset difference signal from the memory 30 and generates an output signal which is supplied to AND gate 22 and inverter 32. The outputs of inverters 32 and 24 are supplied to an AND gate 34 and the outputs of AND gates 22 and 34 are respectively supplied to indicator means 36 and 38.

It should be apparent to one skilled in the art that the light source 2 could comprise a laser type light source or just a conventional light source such a flash tube. In addition, it would also be possible to provide the light source on the exterior of the housing 10 and eliminate a portion of the fiber optic bundle 4. The detectors 6 and 14 could be any light detector which senses the magnitude of the light over a broad spectrum. Such a device would be a conventional photodiode. In addition, the memories 20 and 30 comprise preset voltage values. Furthermore, it should be apparent to one skilled in the art, that while the apparatus at FIG. 2 has been described in terms on an analog system, the apparatus of FIG. 2 could be implemented by digital circuitry utilizing analog to digital converters at the outputs of the detectors 6 14 and 16a through 16d and by using digital components such as a read-only memory, digital comparator and digital subtractor.

The operation of the present invention will be described in terms of the flow diagram of FIG. 3. For the purposes of description, it is assumed that if the comparisons are affirmative the chick is a male.

In operation, first the anal area of a chick is brought in in close proximity to the end of the tube 8. Next the light source is caused to generate a light burst by the actuation of a switch 3. The light from the light source 2 travels down the bundle 4 to the detector 6 and through the bundle 4 to the anal region of the chick. The detector 6 senses the magnitude of the light from the light source and the light which is applied to the anal area of the chick through the bundle 4 is reflected and received by the second bundle 12.

Reflected light received by the bundle 12 is applied to the detector 14 and to the plurality of frequency sensitive light detectors 16a through 16d. The detector 14 senses the magnitude of the reflected burst and supplies an output; while the frequency sensitive detector 16a through 16d senses the magnitude of the reflected light in particular frequency ranges. These frequency ranges are selected so that the color of the male chick anal region can be distinguished from the color of the female chick anal region. In particular, while the anal regions of both male and female chicks are generally pink, the anal region of a male chick is more red or orange, while the anal region of a female chick is more white. Accordingly, by setting the frequency sensitive detectors 16a through 16d to be sensitive to reds and oranges, it is possible to distinguish the color of the female chick anal region from the male chick anal region. The outputs of the frequency sensitive detectors 16a through 16d are supplied to the comparator 18 wherein the output signals are paired with the preset values from the memory 20. If the preset values of the memory 20 at least correspond to the values of the output signals from the frequency sensitive detectors 16a through 16d, a comparator 18 generates an affirmative or logical ONE signal which is applied to the AND gate 22 and the invertor 24.

The output signals from the detectors 6 and 14 are supplied to a subtractor 26 which subtracts the magnitude sensed by the detector 14 from the magnitude detected by the sensor 6. Since the anal region of a male chick is more glossy and therefore, more reflective than the anal region of a female chick, the difference between the magnitude sensed by detector 6 and the magnitude sensed by detector 14 will be less if the chick under test is a male chick. Therefore, if the difference exceeds some preset maximum, the chick is a female chick. Accordingly, a present maximum difference DF for a female chick is supplied by the memory 30 to the comparator 28. The comparator 28 compares difference D from the substractor 26 with the difference DF from the memory 30 and if the DF is greater than D, the comparator 28 generates an affirmative or logical ONE signal which is supplied to the AND gate 22 and inverter 22.

It should be apparent from the flow diagram of FIG. 3 that if both comparators 28 and 18 generated an affirmative or logical ONE signal, the AND gate will generate an affirmative or logical ONE signal which is indicative that the chick is a male. Such signal from the AND gate 22 is spplied to an indictor means 36 such as the lamp 40 in FIG. 1. Contrary to the above, if both outputs from the comparators 18 and 28 are negative or a logical zero, the outputs will be inverted by the invertor 24 and 32 and the AND gate 34 will generate an affirmative or logical ONE signal which would be supplied to the indicator 38. The indicator 38 could be a lamp 42 as shown in FIG. 1 and would indicate that the chick under test is a female.

It should be apparent to those skilled in the art that in the above described system shown in the block diagram of FIG. 2, that the timing signals would be utilized to control the processing. Also, while four frequency sensitive detectors 16a through 16d are utilized more or less could be used depending upon the desired accuracy.

Figure 4:
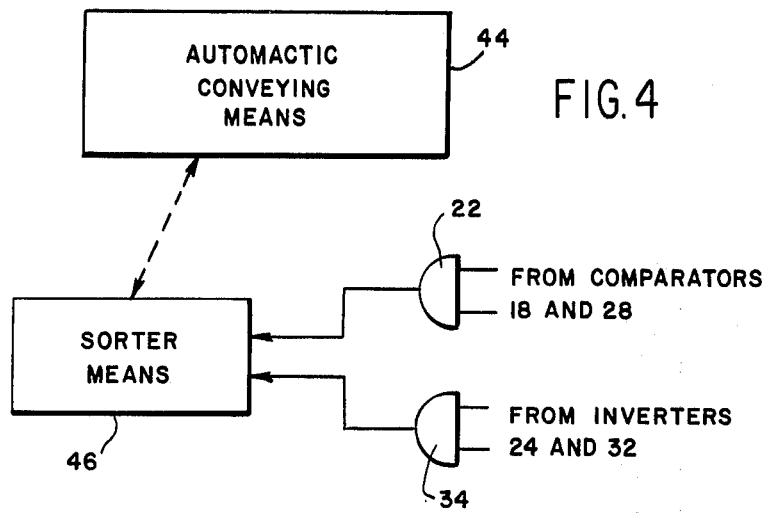
FIG. 4 is a block diagram illustrating additions to be added to the block diagram of FIG. 2 to create a second embodiment of the present invention.

Referring to FIG. 4, shown therein are additions to be made to the block diagram of FIG. 2 to create a second embodiment for automatically determining the sex of a chick. In this second embodiment, the chicks are conveyed by an automatic conveying means 44. The automatic conveying means not only conveys the chicks, but also is designed such that it stops for a short period of time with the anal region of the chick adjacent the tube 8 of apparatus 1. In this way the chicks are automatically brought to the apparatus 1 for determining their sex. When the sex of the chick is determined by the apparatus, the outputs of the AND gates 22 and 34 are applied to a sorter means 46 which cooperates with the automatic conveying means. The sorting means automatically sorts the chicks into male and female in response to the outputs of the AND gates 22 and 34.

Figure 5:
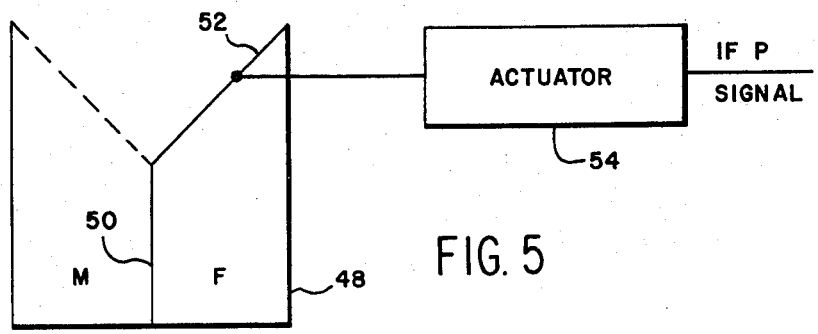
FIG. 5 is a simplified view of the sorter means of FIG. 4.

In particular, the sorter could be an apparatus such as shown in FIG. 5. The sorter means shown in FIG. 5 consists of a box 48 which is partitioned by a partition 50 into two compartments. A plate 52 is pivotally coupled to the partition 50. The plate 52 is pivotally moved by an actuator 54 which is controlled by input signals from the AND gates 22 and 34. In particular, if the actuator 54 receives an affirmative or logical ONE signal from the AND gate 22, it moves the plate 52 to the position indicated by the solid line and causes the automatic conveying means 40 to drop the chick. As a result, the chick will end up in that half of the box 48 indicated as male by the capital M. If the actuator 54 receives an affirmative or logical ONE signal from the AND gate 34, the actuator moves the plate 52 to the position indicated by the dashed lines and causes the conveyor 44 to drop the chick. As a result, the chick will end up in that portion of the box 48 for female chicks which is indicated by a capital F.

It should be apparent to those skilled in the art that the actuator 54 could be a solenoid actuator, hydraulic actuator or a pnuematic actuator. Furthermore, the conveying means 44 could be a conveying belt or some other conveying means which utilizes cone shaped or cup shaped chick carriers.

Figure 8:
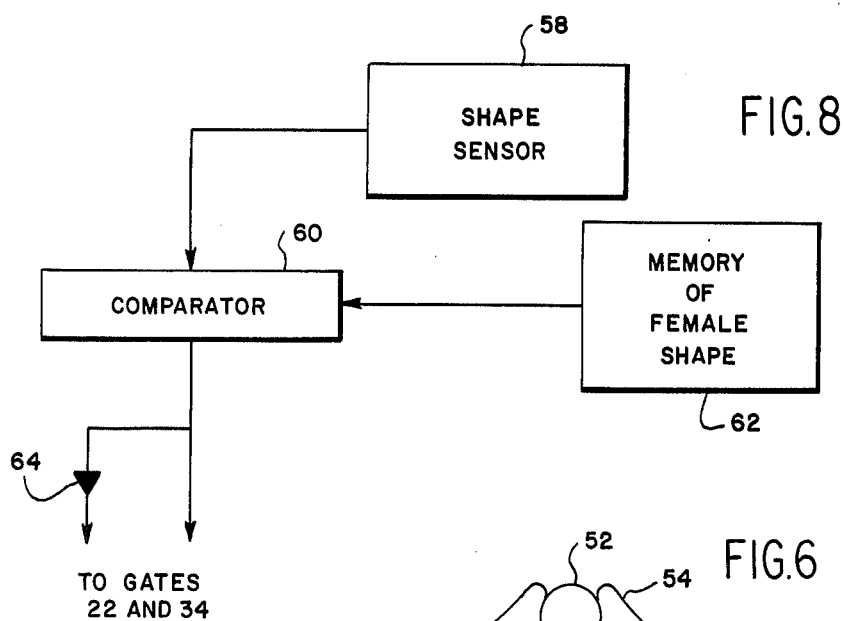
FIG. 8 illustrates additions to be made to the combined block diagrams of FIGS. 2 and 4 to create a third embodiment of the present invention.

Referring to FIG. 8, shown therein are additions to the combination of the block diagram of FIG. 2 and FIG. 4 to create a third embodiment of the present invention. In this embodiment all of the elements described in the FIGS. 2 and 4 operate in exactly the same manner. However, in this third embodiment another characteristic of the anal region of the chick is sensed.

Figure 6:
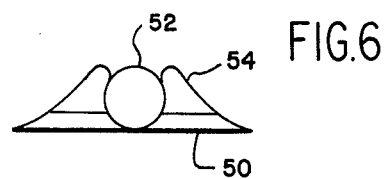
FIG. 6 is a line drawing illustrating the normal anal region of a male chick.
Figure 7:
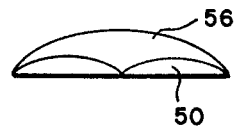
FIG. 7 is a line drawing illustrating the normal anal region of a female chick.

In particular, in this third embodiment the shape of the anal region of the chick is sensed. The anal regions of normal male and normal female chicks are shown respectively in FIGS. 6 and 7. The anal region of a male chick consists of cuticle 50, a phallus 52 and semi-circulator phallus supporting wall 54. The female chick anal region includes cuticle 50 and an inner part 56. As is apparent from FIGS. 6 and 7, the anal region of a male chick is quite different from the anal region of a female chick and therefore a determination of sex can be more accurately made by adding in this additional sensed characteristic.

In particular, the embodiment of FIG. 8 includes an anal region shape sensor 58. This anal region shape sensor 58 may comprise a laser scanner or a television camera. The output of the shape sensor 58 is supplied to a comparator 60 which also receives the output of a memory 62. The output of the comparator 60 is supplied to the AND gate 22 and to the AND gate 34 via an additional invertor 64.

Figure 9:
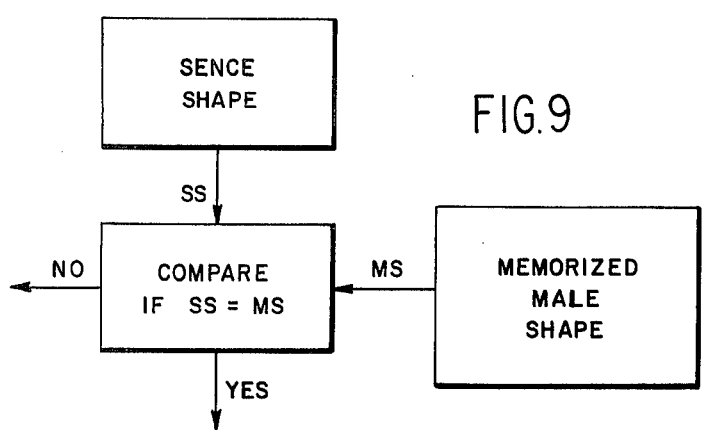
FIG. 9 is an additional flow diagram to be added to the flow diagram of FIG. 3 to illustrate the function of the third embodiment of FIG. 8.

Referring to FIG. 9, shown therein is an additional flow diagram to be added to the flow diagram of FIG. 3 to illustrate the operation of the additions of FIG. 8. The shape sensor 58 senses the shape and supplies a shape signal SS to the comparator 60. The memory 62 contains the shape of anal region of a male chick. This memorized shape can be in the form of digital informaltion or analog information and the memorized shape MS is supplied to the comparator 60. If the sensed shape SS equals the memorized shape MS then the comparator 60 generates an affirmative or logical ONE signal. If they are different, the comparator circuit 60 generates a negative or logical ZERO signal. These affirmative and negative signals are applied to the gate 22 directly and to the gate 34 indirectly via an additional invertor 64. Therefore, if all three outputs from the comparators 18, 28 and 60 are affirmative, the apparatus 1 will indicate that the chick is a male. In the alternative, if all of the outputs of the comparators 18, 28 and 60 in the negative, the apparatus 1 will indicate that the chick is female.

It should also be apparent to one skilled in the art that it would be possible to include a sensor for sensing the softness of the anal region and comparing the sensed value with some preset value to add this fourth sensed characteristic to the present apparatus. Furthermore, it would be further possible to add weighted values to each of the characteristics depending upon their importance and design the circuitry to determine the sex of the chick dependent upon a weighted value for each of the characteristics.

It should be apparent to those skilled in the art that the above-described embodiments are merely illustrative of but a few of the possible specific embodiments which represent the applications and the principles of the present invention. Numerous and various other arrangements may be readily devised by those skilled in the art without departing from the spirit and scope of the invention.

I claim:

1. A means for determining the sex of a chick comprising:
    means for sensing certain characteristics of a chick and producing output values corresponding to each of the sensed characteristics, said means for sensing certain characteristics of a chick comprises:
        a means for generating a burst of light;
        a means for applying the burst of light to an anal region of the chick;
        a means for sensing the magnitude of said burst of light; and
        a means for sensing the magnitude of the light reflected from said anal region of said chick;
    means for comparing said output values with preset characteristic values and for producing affirmative signals whenever each of said output values correspond to said preset characteristic values; and
    a means for indicating the sex of said chick in response to said affirmative values.

2. A means for determining the sex of a chick according to claim 1, wherein said means for comparing said output values with preset characteristic values comprises:
    a subtractor for subtracting the sensed magnitude of the reflected light from the sensed magnitude of the light burst and for producing a difference signal;
    a means for memorizing a preset difference signal; and
    a first means for comparing the difference signal and the preset difference signal.

3. A means for determining the sex of a chick according to claim 2, wherein said means for sensing further comprises:
    a plurality of means for sensing the magnitude of said reflected light at particular frequency ranges and for producing output signals corresponding to said sensed magnitudes;
    a means for storing preset values corresponding to each of said frequency ranges; and
    second comparator means for comparing the preset values of said memory with said sensed values.

4. A means for determining the sex of a chick according to claim 3, further comprising:
    automatic conveying means for conveying said chicks to said means for sensing and for placing said anal region of said chicks adjacent said means for sensing certain characteristics; and
    a sorter means for sorting said chicks into male and female in response to the outputs of the first and second comparators.

5. A means for determining the sex of a chick according to claim 4, wherein said sorter means comprises:
    a container;
    a partition dividing said container into two compartments;
    a plate pivotally coupled to said partition; and
    an actuator coupled to said plate, said actuator pivotally moving said plate in response to the output of said first and second comparators, whereby said chicks are sorted into male and female.

6. A means for determining the sex of a chick according to claim 5, further comprising:

a means for sensing the shape of the anal region of said chick;
a memory means for storing a preset shape; and
a third comparator means for comparing the sensed shape with the memorized shape.

* * * * *